March 27, 1956  G. W. HAYCOCK  2,739,695
CONTROL MECHANISM IN OR FOR MACHINES FOR WORKING
ON BOTTLES AND OTHER LIKE ARTICLES
Filed Dec. 28, 1951  4 Sheets-Sheet 4
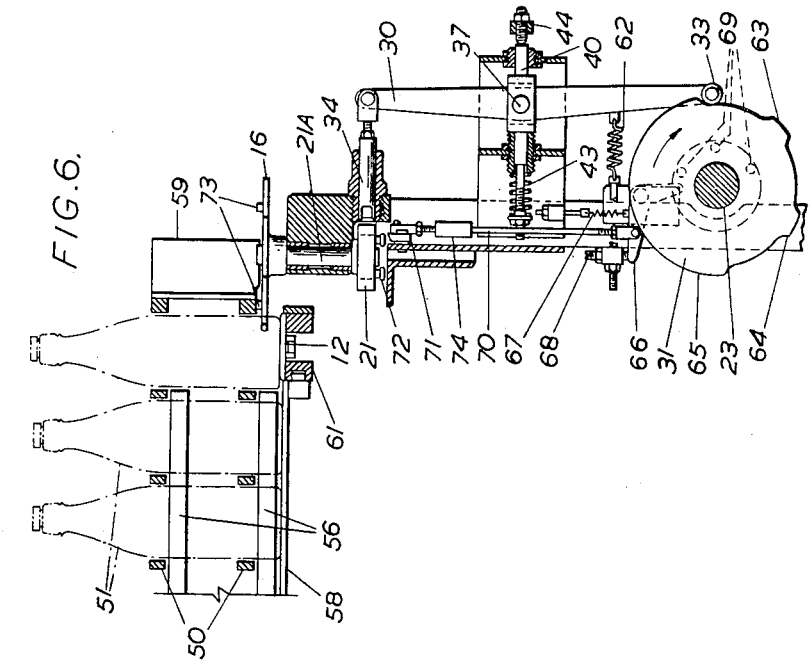
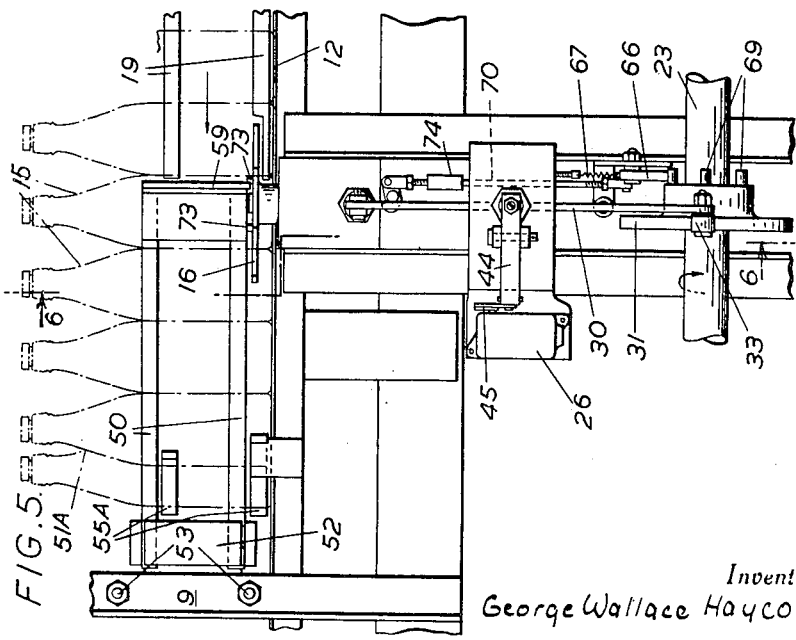
Inventor
George Wallace Haycock
By
Richardson, Davis and Nordon
his Attorneys

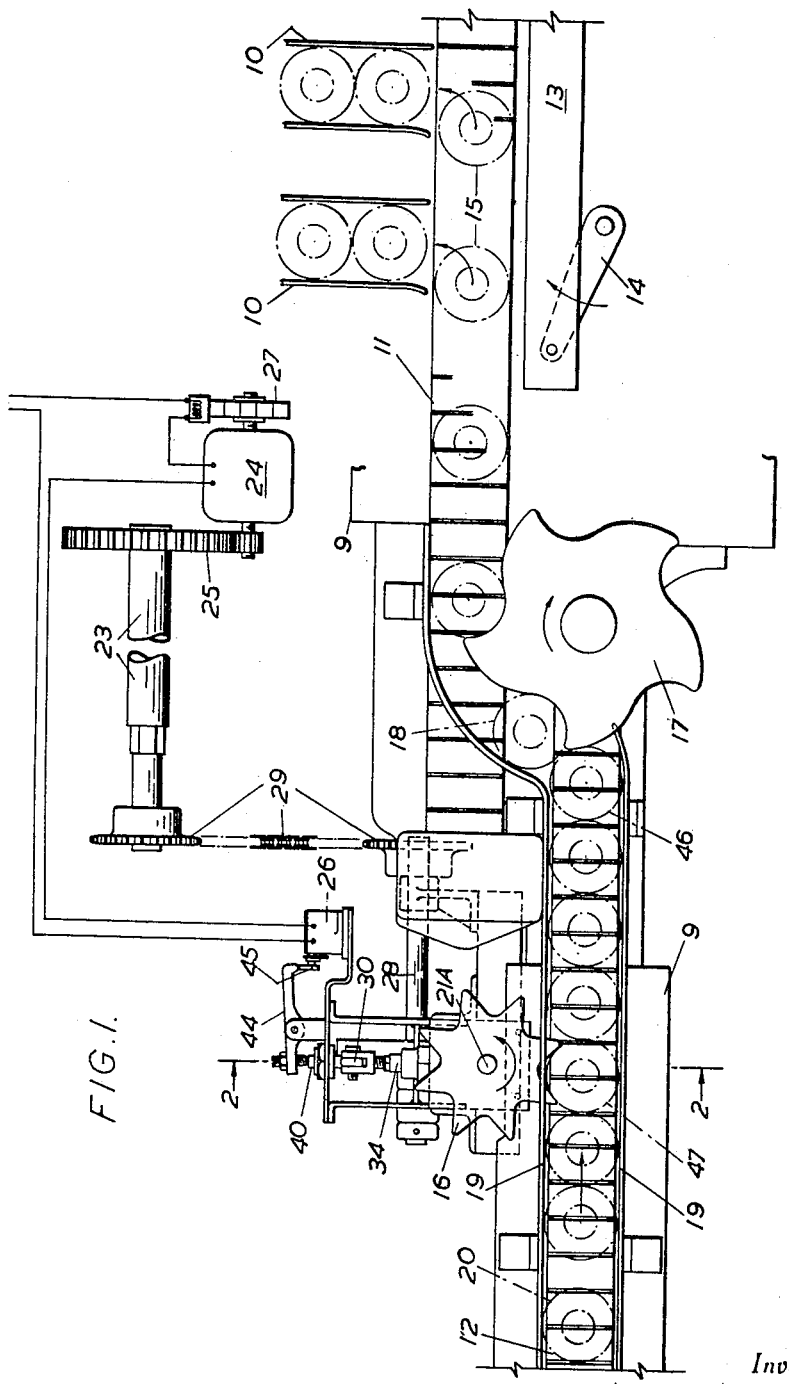

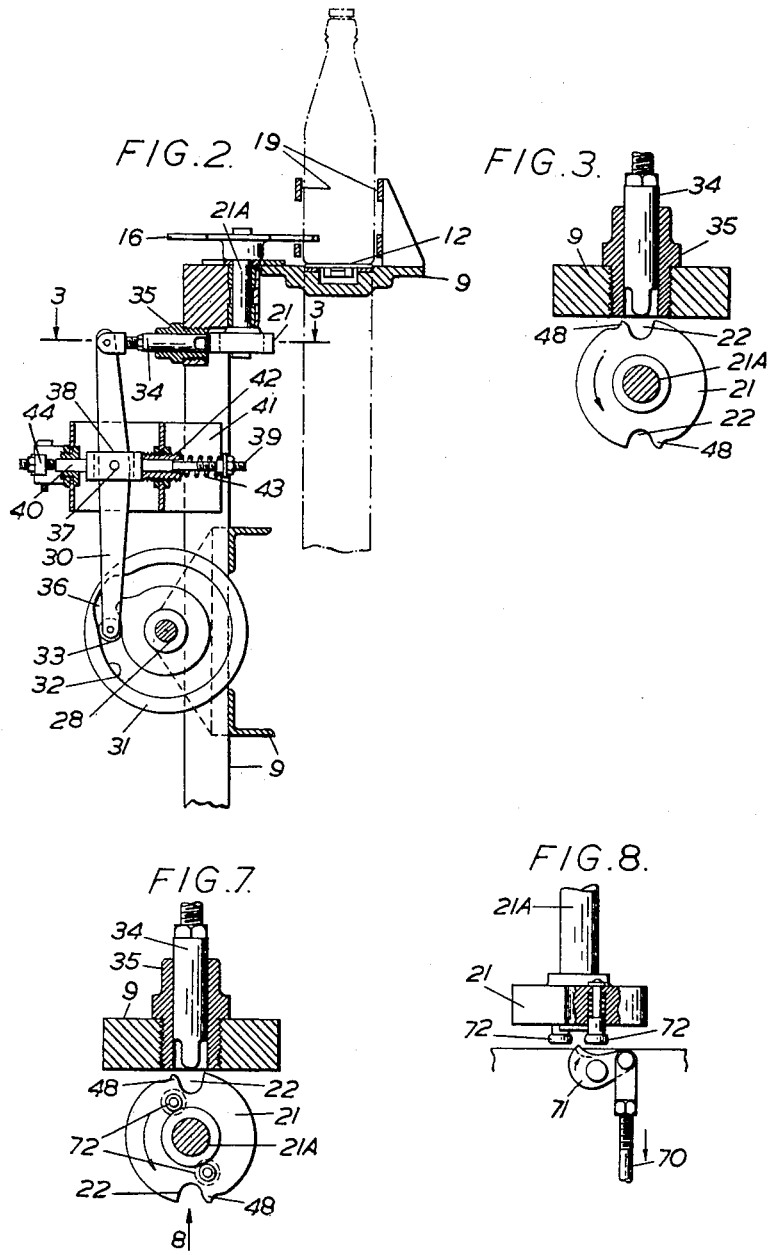

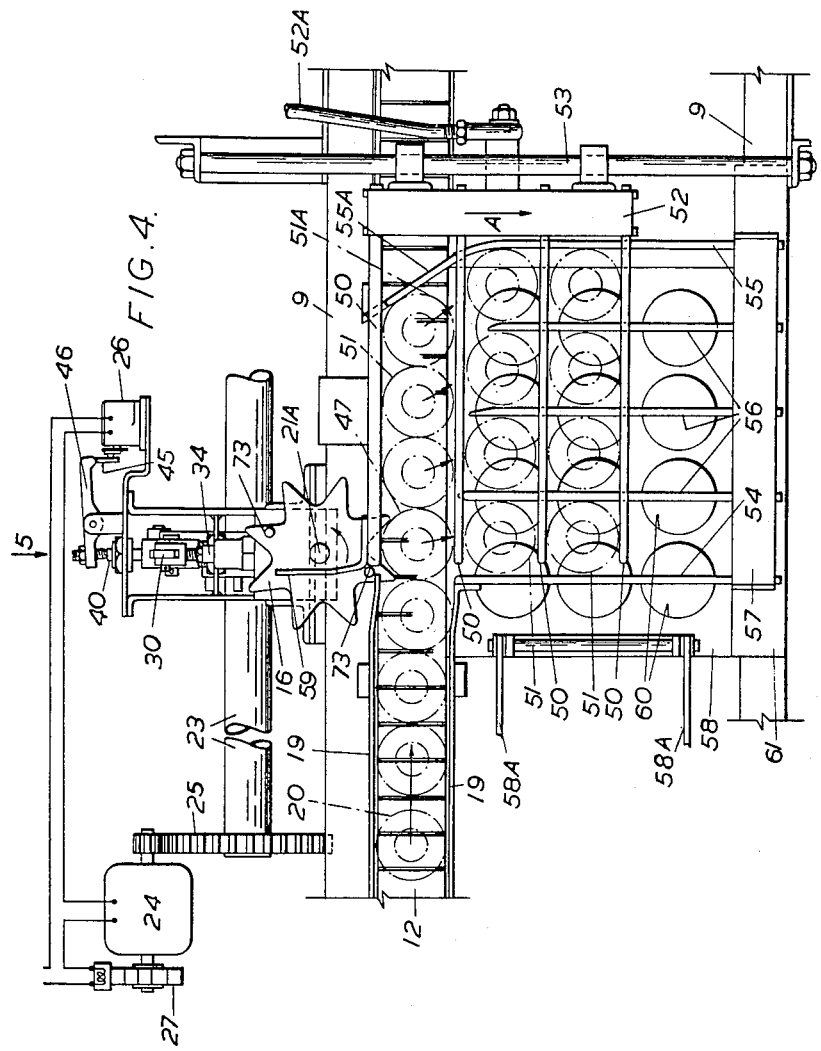

United States Patent Office

2,739,695
Patented Mar. 27, 1956

2,739,695

CONTROL MECHANISM IN OR FOR MACHINES FOR WORKING ON BOTTLES AND OTHER LIKE ARTICLES

George Wallace Haycock, Glasgow, Scotland, assignor to Haybar Limited, Glasgow, Scotland Application December 28, 1951, Serial No. 263,773

Claims priority, application Great Britain January 1, 1951

18 Claims. (Cl. 198—34)

This invention relates to control mechanism in machines which work on bottles, jars and like articles (hereinafter generally called "articles") that are conveyed in succession to the working zone of the machine and which depend for their satisfactory operation on a regular supply of such articles to said zone. Instances of such machines are, inter alia, machines for labelling bottles and machines for packing bottles into cases, boxes or cartons.

According to the invention the control mechanism in or for a machine for working upon articles is characterised by two operatively associated components, one of which is driven in unison with the machine and the other of which is moved, for instance in the way that a turnstile is turned, by the articles being conveyed through or to the machine, the operative association between the said components being such that as long as the supply of articles remains regular the components co-operate to remain in phase with each other and the machine continues to operate, but whenever an irregularity in the supply of articles occurs the components become out of phase and inter-act so that the control mechanism stops the machine, wholly or in part.

The control mechanism may be adapted to cause the machine to re-start, or to set the starting gear of the machine for hand-starting, whenever the supply of articles is resumed.

Provision may be made for ensuring that, after a stoppage by the control mechanism, there is an adequate supply of articles being conveyed to the machine before the control mechanism can cause re-starting or set for hand-starting.

The control mechanism is applicable for instance to machines that work on the articles in succession, i. e. one at a time; and when so applied the mechanism exercises its function as a machine-stopping contrivance in regard to the articles individually. The control mechanism is also applicable to machines that work on the articles in batches, i. e. two or more at a time; and when so applied the mechanism may exercise its said function in regard to the articles in batches.

The control mechanism also exercises the function of regulating the timing of the supply of articles past it in relation to the operations of the machine. That is to say, the control mechanism may hold each article or batch in succession and release it at an instant in correct time-relationship with an operation of the machine. The period that an article or batch is held may be of a pre-determined duration.

In the preferred practical construction, the control mechanism has, as a component driven in unison with the machine, a lever which is recurrently rocked by a machine-rotated cam; and the mechanism has, as a checking component turned by the articles, a star-wheel which is engaged and turned stepwise by the articles in their passage to the machine; and the mechanism also has a specially formed stop wheel which is connected with the star-wheel, so that both turn in unison, and formations of which co-operate with the lever. The arrangement is such that if there should be a failure in the supply of articles, counted as individuals or counted as batches, the stop wheel displaces the lever to stop the machine. The stop wheel may have formations in the nature of a rim with one or more openings, and the lever may have a projecting tongue capable of freely entering any of the openings and a spring-loaded fulcrum which is displaceable when the lever is rocked and the tongue fails to register with and enter the opening or an opening.

Means provided, as aforesaid, to ensure that there is an adequate supply of articles before the control mechanism can cause re-starting, or setting for hand-starting, may comprise an extra formation on the stop wheel functioning as an obstruction which is engageable by the lever and which is yieldable only under the cumulative force exerted by an approximately predetermined number of articles, in unbroken succession, to turn the star-wheel.

Examples of the control mechanism embodying the preferred construction of the present invention will now be described as applied to two different kinds of machines for working on bottles, with reference to the accompanying drawings, which are partly diagrammatic and in which:

Fig. 1 is a plan of the control mechanism applied to a bottle labelling machine, this view being partly diagrammatic. Fig. 2 is a section on the line 2—2 of Fig. 1. Fig. 3 is a fragmentary plan, partly in section on the line 3—3 of Fig. 2 showing a constructional detail.

Fig. 4 is a plan corresponding to Fig. 1 but showing a control mechanism applied to what may be called a "bottle packing" machine, this view also being partly diagrammatic. Fig. 5 is an elevation of the mechanism as viewed in the direction of arrow 5 of Fig. 4. Fig. 6 is a section of the control mechanism approximately on the line 6—6 of Fig. 5. Fig. 7 is a view similar to Fig. 3 but showing the detail modified to suit this application of the control mechanism. Fig. 8 is another detail view, being in the direction of arrow 8 in Fig. 7.

Referring firstly to the construction according to Figs. 1 to 4, the bottle labelling machine to which the control mechanism is shown applied is designed for labelling a batch of four bottles simultaneously. The labelling machine itself is of known construction and therefore only such parts of the machine are shown as are necessary to enable one to understand the present invention. In this application of the control mechanism, the chief functions of the mechanism are to pass batches of bottles in correct time relationship with the bottle labelling machine and to stop the machine in the event that a complete batch of bottles fails to follow at the required timing that batch which has passed the mechanism. In other words, the mechanism checks each batch of bottles, and the place where each bottle registers fully with the mechanism may be called the "checking point."

Referring to Figs. 1 to 3, the labelling machine has a frame 9. This frame incorporates four transverse gangways 10, of which only two are shown, leading from one side of an offset conveyor 11 known usually as the "feed table" conveyor, which is supplied by a separately and continuously driven bottle supply conveyor 12, which is driven at a speed such that it tends to over-supply the bottles; that is, to supply them to the checking point at a rate slightly greater than that at which the labelling machine can pass them. Both conveyors travel from left to right as viewed in Fig. 1. The inlet ends of the gangways 10 are associated with a laterally swinging bar 13 which is carried by a pair of rotary cranks 14, of which only one is shown. The swinging of the bar 13 is timed so that the bar strikes simultaneously the row of bottles 15 arranged as a batch on the conveyor 11 in register with the respective gangways 10 and transfers them to the gangways.

In the example, the bottle supply conveyor 12 leads straight to and past a bottle-checking star-wheel 16, which is incorporated in the control mechanism as the article-driven component thereof. The conveyor 12 terminates at a rotary spacing wheel 17 with sickle-shaped arms, the wheel 17 being a component of the labelling machine. In the example, there are five of these sickle-shaped arms. The spacing wheel 17 functions to transfer the bottles to the feed table conveyor 11, Fig. 1 showing a bottle 18 being transferred. It will be seen that side guide rails 19 serve to guide the bottles 20 in their passage upon the bottle supply conveyor 12 to the wheel 17 and to guide each bottle 18 during its transfer.

In this example, the star wheel conveniently has eight points, each curving into its neighbors, so that eight bottles give the wheel a complete revolution.

The control mechanism also includes a stop wheel 21 which is secured to the same short vertical shaft 21A as the star wheel 16, this shaft being journalled in the frame 9. In the example, the stop wheel 21 has two openings 22, one opening to each batch of bottles, namely to each four points of the star wheel 16.

The labelling machine also includes a main shaft 23 which, as Fig. 1 shows diagrammatically, is driven by an electric motor 24 through gears 25, the motor being under the control of a self-closing electric switch 26 and having an electro-magnetic brake 27 which in known manner comes into action to bring the motor to an almost instantaneous stop whenever the switch 26 is opened. As is usual in such brakes, the brake 27 automatically releases the motor whenever starting current is supplied to it by closure of its electric circuit including the switch 26. It is from the main shaft 23 that the feed table conveyor 11 and the cranks 14 are driven by transmissions not shown but known in the art. The main shaft 23 is utilised to drive a cam shaft 28 incorporated in the control mechanism, a chain-and-sprocket drive 29 being adopted.

As previously stated herein the control mechanism includes a machine-driven component. In the example, this component includes a lever 30 (Fig. 2) which is recurrently rocked by a cam 31 secured to the cam shaft 28. The cam incorporates a groove 32 which is engaged by the cam follower, namely a roller 33 at the foot of the lever 30. The top of the lever is pivotally connected to a tongue 34 which functions as a detector and is slidable in a stationary bearing bush 35 in the frame 9 of the machine. This tongued lever functions as a detection means in co-operation with the stop wheel 21 (Fig. 3), the tongue 34 being adapted either to engage the rim of the stop wheel or to enter either of the openings 22. The timing of the various driven parts is such that the cam 31 turns one revolution in the time allowed for the conveyance of a batch of four bottles past the star wheel 16; and, seeing that the cam groove 32 has a single "hump" 36, the lever 30 is rocked to-and-fro once in the time stated. The lever 30 has a fulcrum 37 (Fig. 2) in a yoke 38 which has co-axial rods 39, 40 that are slidable in a fixed bracket 41 on the frame 9. The yoke is normally held stationary against an adjustable abutment 42, through which the rod 39 is slidable, by a spring 43 acting on this rod. The other rod 40 is a striker which is engageable with a lever 44 which bears on the actuating member 45 of the switch 26 (see also Fig. 1).

The sickle-shaped arms of the spacing wheel 17 present, in succession, to the incoming bottles 20 what may be called a "point of abutment"; in Fig. 1, a bottle 46 is shown at this point. Another bottle 47 is shown at the previously mentioned "checking point," namely the point where a bottle registers fully with the star wheel 16. In this example, there is accommodation for five bottles between the checking point and the point of abutment, including the two bottles 46, 47 then at these points. The arrangement is such that as each bottle comes against a point of abutment, namely to the position 46, and therefore before being deflected transversely through position 18 by the spacing wheel, the aforesaid five bottles 47 to 46 packed on the supply conveyor 12 momentarily slow down or stop; and the bottle 47 then at the checking point locates the star wheel 16 so as to let the tongue 34, as it functions as a detector, freely enter and shortly afterwards withdraw from the appropriate stop wheel opening 22, the lever 30 being at that period actuated by the cam hump 36. Continuation of the passage of the bottle 47 from the star wheel towards the spacing wheel turns the star wheel further so as to set the last-entered opening 22 out of register with the now withdrawn tongue 34. The next batch of four bottles 20 as they advance with the conveyor 12 turn the star wheel so that at the moment when the fourth bottle of the batch reaches the checking point the other opening 22 is in register with the tongue 34, so that the machine continues its operation. If, however by the due time less than four bottles have operated on the star wheel (that is, in the event that the batch is incomplete) the appropriate opening 22 does not come into register with the detector tongue 34, so that when the cam hump 36 operates the lever 30, the tongue is intercepted by the rim of the stop wheel 21, so that the fulcrum assembly 37—40 is displaced against the action of the spring 43 and so the striker 40 acts through the parts 44, 45 to open the switch 26 and stop the motor 24. It will be manifest that, in the machine-stopping displacement of the fulcrum assembly 37—40, the rim of the stop wheel 21 provides an abutment for the detector tongue 34, which thus can serve temporarily as a fulcrum to the lever 30, so that the lever is displaced about this temporary fulcrum by the cam hump 36; that is, the cam 31 co-operates with the stop wheel 21 to stop the machine through the intermediary of the detection means 30, 34. Thus, on stoppage of the motor 24, the labelling machine will be instantly brought to rest by the action of the brake 27.

Even if no bottles at all are supplied to the receptacle, the same stoppage will occur, because of the action of the last bottle 47 of the preceding batch on the star wheel, namely said bottle on leaving the checking point turns the star wheel 16 sufficiently to bring the last-registering opening 22 into an out-of-register position.

Seeing that the separately driven conveyor 12 will continue to supply bottles, when eventually one or more bottles are advanced to complete the batch (in which event there will be five bottles between the checking point at 47 and the point of abutment at 46) the star wheel turns to bring the appropriate opening 22 again into register with the tongue 34. That is to say, the continued supply of bottles has the effect of bringing the star wheel 16 again into phase with the cam 30; and the machine will then automatically re-start by the return of the fulcrum yoke 38 to its normal position against the abutment 42, in which position the switch 26 closes again and re-starts the motor 24.

Because of the already mentioned tendency of the conveyor 12 to over-supply bottles to the star wheel, the tongue 34 when in the opening 22 may hold the stop wheel against rotation for an instant before the tongue withdraws, thus maintaining synchronism between the rate of supply past the star wheel and the working of the labelling machine.

It is undesirable to re-start the labelling machine after a stoppage, merely to deal with, say, a batch of bottles or other small number. Accordingly provision is made for stopping the machine in the event that each batch, when passing through the control mechanism, is not followed by an adequate unbroken succession of bottles, on the supply conveyor, say about a dozen bottles.

The means provided comprises a resistance device, which comes into action when the last bottle 47 of each batch is operating the control mechanism and which requires the pressure against said mechanism of say a dozen bottles 20 on the supply conveyor 12 to overcome the resistance of said device.

In the example, the resistance device is a pair of groove formations 48 in the rim of the stop wheel 21 (see Fig. 3), one of these formations being arranged closely in advance of each opening 22. Each of these formations in its turn exercises a yieldable hold on the tongue 34 of the cam-rocked lever 30, the hold being such that the wheel 21 yields only under the pressure applied by, say, so many as a dozen bottles on the supply conveyor to the last bottle 47 of each batch on the passage of that bottle into the checking point.

In the example, there is provision for five bottles between the checking and abutment points, both included. The minimum number for which provision must be made is the number of bottles per batch on the labelling machine, which number in the example is four. Any appropriate greater number may be provided for between said points.

In the second example, which is shown in Figs. 4 to 8, the control mechanism is applied to a bottle packing machine which is the subject of my concurrent patent application Ser. No. 263,774 and particulars of which are given in the specification of my said application. In my present specification, there are given only such particulars of the packing machine as are useful for complete understanding of the control mechanism applied thereto.

In the packing machine, the bottles are cased in groups of a dozen each, each group being composed of three batches of four bottles, arranged in three side-by-side longitudinally rows. In this example, the control mechanism is devised to perform two functions, namely:

(1) To stop the working parts of the packing machine in the event that no bottles, or less than four bottles, are supplied to, for checking by, the checking component, again a star wheel, in the time allowed for filling a bottle-receiver provided by a component of the machine that may be called a bottle-locator;

(2) To regulate the timing of the supply of bottles in their passage past the star wheel in relation to the operations of the bottle-locator, including the provision of a comparatively long period of stoppage in such passage.

Referring now to Figs. 4 to 8, parts similar or corresponding to those already described with reference to Figs. 1 to 3 are again indicated by the same reference numbers.

The bottle packing machine includes a motor-driven main cam shaft 23, cams (not shown) on which control and/or operate various mechanisms (including the aforesaid bottle-locator) taking part in the cycle of operations of the machine. As in the previous example, the shaft 23 is driven by an electric motor 24 through gears 25, and the motor is controlled by a switch 26 and has an electromagnetic brake 27. The bottle supply conveyor 12 of the machine is driven separately and continuously, so that when the main cam-shaft drive is stopped, the conveyor continues with its work of supplying bottles to the machine. Moreover, the conveyor 12 is driven at a speed great enough to ensure a slight over-supply of bottles, as in the previous example.

The bottle-locator comprises a set of pairs of longitudinal fingers 50, there being four pairs and the pairs being equi-spaced to define three longitudinal passages which may be called "bottle receivers," each of which can accommodate four bottles 51, as Fig. 4 shows. The fingers extend from a carrier 52 which is movable transversely by cam-operated mechanism including a rod 52A, the carrier being slidable along guide rails 53 secured to the packing machine frame 9.

As is explained in the specification of my already mentioned concurrent patent application, the following is the cycle of operations of the bottle-locator 50:

The carrier adopts four successive positions and, between them, receives three transverse steps in the direction (see arrow A, Fig. 4) away from the supply conveyor 12, and thereafter a return movement. In the first, second and third positions, respectively, the supply conveyor 12 is aligned with the three bottle receivers in succession so that each receives its supply of four bottles. These three positions are reached one at a time by the return movement and the first two steps thereafter. Fig. 4 shows the bottle-locator at the end of the second of these steps. At the third step, the carrier reaches and dwells in a position where all three receivers are in what may be called "the packing zone."

The packing machine also includes a set of five stationary transverse spacers, namely two outer spacers 54, 55 and three intermediate spacers 56, with which the bottle-locator fingers co-operate. Each of the stationary transverse spacers consists of a pair of members arranged one above the other. The spacers extend towards the supply conveyor 12 from a fixed support 57 on the frame 9 and are arranged in the packing zone above another component of the packing machine, namely a bottle-support 58. The three intermediate spacers 56 are arranged to come between four transverse rows of three bottles, and the two outer spacers 54, 55 form the longitudinal limits for each group of bottles. Thus, the five spacers form four transverse "gangways" for the bottles, each gangway having accommodation for three bottles. The proximal limit spacer 54 is joined to the adjacent guide rail 19 of the supply conveyor 12 so as, in effect, to serve as a right-angled continuation of said rail. The distal limit spacer 55 has an inclined extension 55A across the supply conveyor 12 adapted to intercept the leading bottle 51A of each row of four, and the extension 55A is curved to guide the bottles appropriately during transfer to the bottle support 58. Moreover, the ends of the intermediate spacers 56 are arranged and shaped to guide the bottles 51 when they pass from the supply conveyor 12 to the bottle support 58.

As Fig. 4 shows, the bottle-locator fingers 50 cross the transverse spacers 54, 55, 56 and co-operate with them to form a dozen bottle compartments and thus simulate the partitioned case into which the bottles are to be packed.

It may be added that the action of the bottle-locator cam on the link-and-lever mechanism, of which only the rod 52A is shown, is such that if, for any cause, the bottle-locator cannot return from the packing zone, the cam turns idly clear of said mechanism.

Moreover, in view of the contingency that the bottle-locator might not return as aforesaid, the bottle-locator has a bottle-stop 59 consisting of a member which extends transversely from the outer pair of fingers so as to serve as a barrier across the supply conveyor 12 when the bottle-locator is in the packing zone.

The bottle-support 58 is a retractible component of the packing machine. The support is a plate formed with a dozen holes 60 which are somewhat larger than the bottles and which are arranged and spaced in rows similarly to an assembled group of bottles. The plate 58 is mounted in side rails 61 which are incorporated in the machine frame 9 and which form a longitudinal slideway, so that the bottle-supporting surface of the plate comes substantially flush with the supply conveyor 12. The slideway is arranged in the place called the packing zone. That is to say, the slideway is directly above that portion of a delivery conveyor, another component (not shown) of the packing machine, where each successive case is located temporarily to receive a group of bottles. The bottle-support is movable, to an extent equal to only half the pitch of two adjacent transverse rows of three bottle holes, by means of a link-and-lever mechanism, of which only links 58A are shown (Fig. 4), this mechanism being operated by a cam on the main cam shaft 23.

With reference now to the control mechanism, which as aforesaid is in the nature of a stop device, as in the previous example, the machine driven component is a rocking stop lever 30 with a normally stationary fulcrum 37 which can be forcibly displaced against the action of a spring 43 and which is associated with the switch 26 connected with the circuit of the motor 24 that drives the main cam shaft 23. The arrangement is such that when the fulcrum 37 is displaced it actuates the switch through the intervening parts 40, 44, 45 and stops the motor 24; and when the fulcrum returns to its normal position the switch closes and re-starts the motor. The machine-driven component again includes a cam 31 on the shaft 23, but in this example the cam-following roller 33 is held by a spring 62 against the profiled cam edge. The cam has two short humps 63, 64 and one long hump 65. The three spaces between the humps each correspond, as regards time, with the actions of conveying a row of four bottles to each of the three receivers provided by the bottle-locator 50. The short humps 63, 64 each correspond, also as regards time, with the two movements of the bottle-locator between the supplies to the three bottle receivers. The long hump corresponds, also as regards time, with the actions of transferring to the packing zone the group of twelve bottles, packing them in a case and returning the bottle-locator for another supply.

The other end of the stop lever 31 again has a detector in the nature of a slidable tongue 34.

The bottle-driven component of the stop device again includes the same form of star wheel 16, having eight points, between which are formed recesses entered by the bottles in succession as they pass the wheel. The component again includes a stop wheel 21 rotatable by and in unison with the star wheel. The tongue 34, which again co-operates with the stop wheel 21, is adapted to enter either opening 22 in the rim of the stop wheel.

The normal action of the stop device is as follows:

The stop lever 30 and the stop wheel 21 both work in phase. When each hump of the cam 31 turns the lever 30, the detecting tongue 34 freely enters an opening 22, and so for the duration of the hump action the stop wheel and the star wheel are locked and the advance of the bottles 20 past the star wheel 16 is temporarily stopped. These recurring periods of stoppage correspond with the movements of the bottle-locator 50 and with the bottle-packing operation in each complete cycle of operations of the machine, represented by a complete revolution of the main cam shaft 23.

In the contingency that only one, two or three bottles, instead of the requisite four, operate the star wheel 16 for supply to any one of the bottle receivers of the bottle-locator 50, the stop wheel 21 will be proportionately out of phase. Consequently, when the stop lever 30 is turned at the proper instant, the detecting tongue 34 instead of entering an opening 22 will be intercepted by the rim of the stop wheel. Thus, the fulcrum 37 of the stop lever 30 will be displaced, so that the main cam shaft 23 will stop. When the deficiency of bottles is made good by the supply conveyor 12, the operation of which as already stated proceeds without interruption, the appropriate opening 22 registers with the tongue 34 so that the fulcrum 37 returns to its normal location and the cam-shaft motor 24 automatically re-starts.

A stoppage in the manner described would not take place if no bottles were supplied to a bottle receiver, for then in the absence of suitable provision the stop wheel 21 would stay at rest leaving an opening 22 in register with the tongue 34. Therefore the following auxiliary mechanism is provided:

A bell-crank lever 66 (see Figs. 5 and 6) which is normally pulled by a spring 67 against a fixed but adjustable stop 68, co-operates with a series of three strikers 69 arranged on the boss of the three-hump cam 31. The lever is connected by a rod 70 to a pawl 71 (see also Fig. 8) which co-operates with a pair of diametrally opposed buttons 72 on the underside of the stop wheel 21. The timing is such that, during each period allocated to the conveying of four bottles to a receiver of the bottle locator 50 i. e. when the top-lever roller 33 registers with any of the spaces formed between the three humps of the cam 31, one of the strikers 69 acts through the bell-crank lever 66, rod 70, pawl 71 and one of the buttons 72 to impart a short turn to the stop wheel 21. However, these recurring actions of the strikers 69 will be effective only in the event that no bottle turns the star wheel 16, in which event the bottle receiver concerned remains empty. In that event, the appropriate striker 69 by turning the stop wheel 21 moves the last-registering opening 22 from the registration position, with the result that the next turn of the stop lever 30 cuts-out the cam-shaft motor 24.

In order to prevent damage between the pawl 71 and a button 72 in the event that this button should be driven against the back of the pawl, each button is spring-pressed, as Fig. 8 shows so that the convexly rounded back of the pawl will depress the button out of the way.

In this example, formations 48 are also provided on the stop wheel 21 for the contingency that, following a stoppage of the machine, there may be insufficient bottles 20 on the conveyor 12 to merit a re-start.

There is another contingency in respect of which appropriate provision must be made. This contingency relates to the operation of another component of the packing machine, namely a crosshead (not shown) which grips the group of twelve bottles, when properly marshalled in the packing zone, and lowers them simultaneously through the holes 60 of the bottle support 58, which is temporarily pushed forwards by the links 58A for the lowering operation. The bottle-gripping action of the crosshead is such that when the crosshead is lowered, if there should be an obstruction to the bottles say by the case intended to receive them, the crosshead would not release the bottles, so that the bottles would be lifted again in the next ascent of the crosshead. In this contingency, an idle cycle is performed by the machine, the bottle locator being held in the packing zone by the gripped bottles. Throughout this cycle, there are none of the bottles 47, 51, 51A (see Fig. 4) on the conveyor 12 beyond the star wheel, the bottles being kept back by the auxiliary bottle stop 59, which as aforesaid acts as a barrier across the conveyor 12 in proximity to the star wheel 16. In view of the absence of bottles beyond the star wheel, this wheel would ordinarily be free to turn an appreciable amount; and so it would be turned by the continued action, during the idle cycle, of the strikers 69 and the pawl 71 on the buttons 72 of the stop wheel 21, thus causing stoppage of the cam shaft 23.

Therefore, a device is provided which includes a pair of diametrally opposed pins 73 on the star wheel 16, one or other of which engages with the auxiliary bottle stop 59 (see Fig. 4) and positively prevents displacement of the star wheel 16. To avoid breakage of the striker mechanism 66—72 due to the obstruction by the inter-engaging parts 59, 73, there is incorporated in the rod 70 which operates the pawl 71 a telescopic fitting 74 including a compression spring (not shown) which yields and thus permits the rod 70 to elongate temporarily whenever the pawl 71 engages one of the buttons 72 while the star wheel 16 is held by the stop 59 against turning.

Thus it will be clear that, on the occurrence of an idle cycle of the packing machine in which the bottles have been returned by the crosshead, the auxiliary bottle stop 59 engages the star wheel 16 and prevents it from turning, and the telescopic fitting 74 permits the rod to elongate so that the obstruction of the star wheel 16 does not damage the mechanism 66—72 applied to the stop wheel 21.

Any of various modifications may be made. For instance, although in the examples the tongued plunger is operable by a rotary cam, instead the tongue may be operated by a pneumatic or other pressure fluid unit under the control of a rotary valve or by an electromagnetic solenoid under the control of a rotary contactor.

The stop wheel may be suitably driven by the star wheel through speed conversion gearing in order to preserve a practical non-interfering form of star wheel when, for instance, bottles are to be worked in large batches.

In both examples, the switch is self-closing so that on return of the displaced fulcrum of the machine-operated lever the switch automatically re-starts the machine. Instead, the arrangement may be such that a hand starter is tripped when the switch opens to stop the machine, and this hand starter must be actuated by the operator before he can re-start the machine following automatic reclosure of the switch.

In the foregoing specification and in the claims reference is made to a machine for working on bottles and other articles and to means for conveying the articles to the machine. Moreover, the control mechanism of the present invention is capable of stopping the machine, while the conveying means keeps on working. It will be manifest that although the machine and the conveying means may be separate and distinct entities, they may instead both be incorporated as parts of one and the same total mechanical structure, both being driven by the same source and the machine being stoppable independently of the conveying means, say by de-clutching the machine.

I claim:

1. In or for a machine for working upon bottles or like articles supplied to it normally at not less than the rate at which the machine is operated to deliver said articles, a control mechanism comprising a reciprocable and displaceable detection means, means for stopping said machine, said means being operable by said detection means on displacement thereof, rotary means applied to said detection means, a driving connection between said rotary means and the machine so that said rotary means reciprocates said detection means in harmony with said rate, said rotary means being rotated by the machine, a checking component engaged and moved by the articles in their passage to the machine, a stop connected to said checking component so that both move in unison, and a formation on said stop brought into register with said detection means in each reciprocation thereof so long as the articles keep moving the stop with its formation in phase with said detection means, the formation and detection means being so related that on failure in the supply of said articles to said machine said stop lags and intervenes against said detection means, and said rotary means cooperates with said stop to displace said detection means and force the detection means to operate the machine-stopping means.

2. A control mechanism according to claim 1 including also a device applied to said stop and adapted when actuated to transmit a partial step movement to said stop sufficient to bring said formation out of register with said reciprocable and displaceable detection means.

3. In or for a machine for working upon bottles or like articles supplied to it normally at not less than the rate at which the machine is operated to deliver said articles, a control mechanism comprising a rockable and displaceable detection lever means, means for stopping said machine, said means being operable by said lever means on displacement thereof, a cam recurrently rocking said lever means, said cam being rotated by the machine in phase with the operations thereof, a star-wheel in the nature of a turnstile which is engaged and turned by the articles in their passage to the machine, a stop wheel which is connected to so as to turn in unison with the star-wheel, and a formation on said stop wheel cooperating with the lever means so that the formation registers with the lever means on rocking thereof while the stop wheel is in phase with said cam but so that on reduction below said rate in the supply of said articles to said machine said stop wheel intervenes against the lever means, said cam displacing the lever means about the stop wheel as fulcrum to operate the machine-stopping means.

4. A control mechanism according to claim 3 including also means on said cam for holding said lever means for a predetermined period of each cycle of operations in locking engagement with said formation to lock said star-wheel against turning by the articles for said period.

5. A control mechanism according to claim 3 including also means for causing a partial step to be taken by said stop wheel to bring it into an out-of-phase position, said means comprising a projection on said wheel, a member arranged when actuated to strike said projection so as to turn said wheel slightly, and means operated by the machine to actuate said member at predetermined intervals in the operation of the machine.

6. A control mechanism according to claim 3 including also an obstructive formation on said stop wheel, said formation being recurrently engaged by said lever means, which when so engaged yieldingly holds the stop wheel and star-wheel against turning, thus barring the passage of the articles to the machine unless there is an approximate minimum of articles applied to the star-wheel.

7. A control mechanism according to claim 3, including also a plurality of formations on said cam, said formations being so spaced and proportioned that said lever means performs in one cycle of operations of the machine a succession of detecting and locking motions relatively to the stop wheel which is turned in connection with the star-wheel by the articles, said lever means serving to interrupt the motion of said connected wheels locked by the actions of said formations during said cycle.

8. A control mechanism according to claim 7, in which the rockable and displaceable lever means includes a detector which is actuated relatively to the stop wheel once after the time set for a number of turning movements thereof by the actions of the same number of articles passed by the star-wheel to the machine.

9. A control mechanism according to claim 1, in which the rotary means applied to the detection means comprises a cam, a plurality of formations on said cam, said formations being so spaced and proportioned that said detection means performs in one cycle of operations of the machine a succession of detecting and locking motions relatively to the stop which is moved in connection with the checking component by the articles, said detection means serving to interrupt the motion of said connected component and stop by the actions of said formations during said cycle.

10. A control mechanism according to claim 9, in which the detection means has a detector which is actuated relatively to the stop once after the time set for a number of movements thereof by the actions of the same number of articles passed by the checking component to the machine.

11. In or for a machine for working upon bottles or like articles, such machine comprising a zone at which successive batches of the articles are assembled, means near said zone for working upon the articles, a power drive to said working means, a controller for stopping the power drive and a separately and continuously driven conveyor for the supply of the articles to the working means normally at not less than the rate at which the machine is operated to deliver said articles; a control mechanism comprising a checking component which is located beside said supply conveyor in the way of said articles and is engageable in the manner of a turnstile by the articles individually and turned by them, a stop which is connected to said checking component so that both turn in unison and which has an opening, a rockable and displaceable lever, an operative connection between the lever and the machine for rocking the lever in timed relationship with said working means, an operative connection between said lever and the controller such that when the lever is displaced it operates the controller to stop the drive to the machine working means, the last-mentioned operative connection serving normally as a fulcrum to the lever, and a detector having a pivotal connection with said lever and arranged to co-operate with the stop so that when said lever is rocked normally about said fulcrum the detector enters said opening but is abutted by the stop if the lever is rocked whenever the checking component has been inadequately turned by the articles, the abutted detector then serving temporarily as a fulcrum for the lever so that the machine displaces the lever to stop the machine.

12. A control mechanism according to claim 11, in which the lever operated by the machine has as its actuating means a cam, a plurality of formations on said cam, said formations being so spaced and proportioned that said lever performs in one cycle of operations of the machine a succession of combined detecting and locking motions relatively to the stop turned in connection with the checking component by the articles, said lever serving to hold said article-turned stop and component locked by the action of said formations during periods of time in said cycle.

13. A control mechanism according to claim 11 having an additional device applied to the article-turned stop for positively turning the same, in the absence of the normal turning actions on the checking component by the articles themselves, to an extent sufficient to bring the stop into an out-of-phase position.

14. In a machine for working upon bottles and other articles and operatively associated with means for conveying such articles in a path to the machine at a requisite conveyance rate that is not less than the rate at which the machine works, a control mechanism comprising detection means, an operative connection from the machine to said detection means for operating the detection means to keep on moving at regularly recurrent instants in harmony with said rate while said machine is working, said detection means moving under normal article-conveyance conditions in a normal way but being displaceable therefrom if obstructed, means for stopping said machine operable by said detection means whenever displaced from its normal way of movement, and stop means past which the articles are conveyed, said stop means having parts which project in succession into the path of the articles so that said stop means is kept on moving by the articles in phase with the detection means so long as the requisite conveyance rate of the articles is maintained, said detection means being arranged to co-operate with said stop means and move free from obstruction thereby so long as the stop means is being moved in phase with the detection means, and said stop means being arranged to obstruct and cause displacement of said detection means at one of the instants when the detection means is moved by said operative connection in order to operate the machine-stopping means whenever the articles fail to maintain the stop means in phase with the detection means.

15. Control mechanism according to claim 14 in which the detection means comprises a lever having a normal fulcrum between its ends and a slidable detector tongue pivotally connected to one end of the lever, the other end of the lever being applied to the operative connection from the machine and the tongue co-operating with the stop means.

16. Control mechanism according to claim 14 in which the operative connection from the machine incorporates a rotary cam having a hump engageable with the detection means.

17. Control mechanism according to claim 14 in which the operative connection from the machine incorporates a rotary cam having a series of spaced humps successively engageable with the detection means, at least one of said humps being adapted to hold the detection means in locking engagement with the stop means for a substantial period of time in the cycle of operations of the control mechanism.

18. Control mechanism according to claim 14 in which the detection means includes a lever and the means for stopping the machine comprise a controller, a displaceable actuator applied to said controller, a pivotal connection between said actuator and said lever, and spring means opposing displacement of said actuator so that said pivotal connection serves normally as a fulcrum for the lever.

References Cited in the file of this patent

UNITED STATES PATENTS

| | | |
|---|---|---|
| 1,281,580 | Johnson | Oct. 15, 1918 |
| 1,659,831 | Mudd | Feb. 21, 1928 |
| 2,052,840 | Nussbaum | Sept. 1, 1936 |
| 2,515,965 | Nurnberg | July 18, 1950 |
| 2,599,221 | Bergmann | June 3, 1952 |